United States Patent [19]

Warne

[11] Patent Number: 5,284,221
[45] Date of Patent: Feb. 8, 1994

[54] MOTORCYCLE FRAME

[76] Inventor: Monte Warne, 4180 Highway 104 West, Dyersburg, Tenn. 38024

[21] Appl. No.: 849,354

[22] Filed: Mar. 11, 1992

[51] Int. Cl.⁵ .................................. B62K 11/02
[52] U.S. Cl. ........................ 180/219; 180/311; 280/281.1
[58] Field of Search ............... 180/219, 311; 280/281.1, 785

[56] References Cited

U.S. PATENT DOCUMENTS

| | | |
|---|---|---|
| 3,508,765 | 4/1970 | Bauer et al. . |
| 3,937,484 | 2/1976 | Morioka et al. . |
| 3,945,463 | 3/1976 | Okano et al. ............... 180/311 |
| 4,047,730 | 9/1977 | Panoz . |
| 4,226,296 | 10/1980 | Higaki ........................ 180/219 |
| 4,323,135 | 4/1982 | Tominaga et al. . |
| 4,660,854 | 4/1987 | Suzuki et al. ............... 180/219 |
| 4,678,054 | 7/1987 | Honda et al. . |
| 4,691,800 | 9/1987 | Kadono et al. . |
| 4,694,929 | 9/1987 | Sugimoto . |
| 4,735,275 | 4/1988 | Tsukahara et al. . |
| 4,852,678 | 8/1989 | Yamaguchi . |
| 5,025,883 | 6/1991 | Morinaka et al. . |

FOREIGN PATENT DOCUMENTS 3233755  3/1984  Fed. Rep. of Germany ...... 180/219
0109189  5/1991  Japan ........................... 180/219

Primary Examiner—David M. Mitchell
Assistant Examiner—Victor E. Johnson
Attorney, Agent, or Firm—Larson and Taylor

[57] ABSTRACT

A motorcycle frame is provided which enables a conventional automobile engine block to be secured thereto while also eliminating all counterproductive torque generated by the engine block. The frame includes a housing having a pair of subframes of essentially quadrilateral configuration extending parallel to the longitudinal axis of the motorcycle. Each subframe comprises a pair of tubes which may be disconnected for access to the engine blocks. Each subframe is formed by a pair of upper and lower tubes. The subframes are connected at one end to a steering head and angle outwardly approximately one quarter of the length of the subframes with the remaining length extending parallel to the longitudinal axis of the motorcycle. Generally semicircular shaped tubular members are provided for securing each of the subframe upper tubes to the lower tubes to provide reinforcement for the subframes. A plurality of engine block mounts are provided along the inner periphery of the housing for securing the engine block parallel to the centerline of the motorcycle. Additionally, a plurality of support braces are provided for supporting the engine block within the housing.

6 Claims, 3 Drawing Sheets

MOTORCYCLE FRAME

FIELD OF THE INVENTION

This invention relates generally to vehicle frames and, more specifically, to a two wheeled vehicle frame for mounting an automobile V-8 engine along the longitudinal centerline of a vehicle such as a motorcycle, scooter, moped, or any other mechanically powered two wheeled vehicle.

BACKGROUND OF THE INVENTION

In an attempt to increase the horsepower of motorcycles, larger engine blocks are being mounted in conventional motorcycles. One way the mounting for the larger engine block is achieved is by converting the motorcycle to a three wheeled vehicle or by mounting the engine block transverse to the centerline of the motorcycle. Currently, there are no motorcycles which utilize a conventional automobile V-8 engine block.

Several U.S. Patents disclose modified frames to accomplish varied purposes as described hereinafter. U.S. Pat. No. 3,937,484 (Morioka et al.) discloses a motorcycle frame which allows access to the engine mounted below. This access is accomplished by mounting the fuel tank below the seat instead of above the engine.

U.S. Pat. No. 4,047,730 discloses a motorcycle frame for mounting a standard engine. The frame is designed to provide increased flexibility and thus increase rider comfort.

U.S. Pat. No. 4,226,296 (Higaki) discloses a motorcycle frame having a steering head and a pair of upper and lower tubes attached thereto. The lower tubes are designed to suspend a motor which is mounted transverse to the centerline of the frame.

U.S. Pat. No. 4,323,135 (Tominaga et al.) discloses a motorcycle frame for maintaining a standard transversely mounted motorcycle engine.

U.S. Pat. No. 4,660,854 (Suzuki et al.) discloses a motorcycle frame having a main tube connected to the lower end of a steering head so that a gas tank with a larger capacity may be attached to the frame.

U.S. Pat. No. 4,678,054 (Honda et al.) discloses a motorcycle frame which supports a standard motorcycle engine. The frame is provided with a plurality of hollow passages for allowing cable insertion and air flow.

U.S. Pat. No. 4,691,800 (Kadono et al.) discloses a motorcycle frame having a single main frame tube extending from the head pipe to the detachably mounted down frame. The frame is designed to hold a standard motorcycle engine.

U.S. Pat. No. 4,694,929 (Sugimoto) discloses a motorcycle frame having a head pipe and main frame sections having boxed sections which interlock to affix the frame sections to the head pipe.

U.S. Pat. No. 4,735,275 discloses a buggy frame, a four wheeled vehicle, which maintains a transversely mounted engine in the frame.

U.S. Pat. No. 4,852,678 (Yamaguchi) discloses a motorcycle frame having right and left engine support members for maintaining a standard motorcycle engine therebetween. The support members are formed by a plurality of triangular shaped members.

U.S. Pat. No. 5,025,883 (Morinaka et al.) discloses a motorcycle frame having a detachable rear portion. The rear portion of the frame allows for mounting a central trunk as well as left and right trunks.

U.S. Pat. No. 3,508,765 (Bauer et al.) discloses a motorcycle frame having bending moments which are generated in the backbone due to the dynamic loading on the frame. Attached to the backbone are two pairs of tubes which are triangulated with the backbone so that when the backbone is loaded, the tubes act substantially as struts.

SUMMARY OF THE INVENTION

In accordance with the invention, a motorcycle frame is provided which enables a conventional automobile V-8 engine block to be secured thereto while also eliminating all counterproductive torque generated by using the engine block. Additionally, by utilizing a conventional automobile engine block, a fivefold increase in the horsepower is created while only increasing the weight of the motorcycle by 100 pounds.

According to a preferred embodiment of the invention, the frame comprises a housing having a pair of subframes of essentially quadrilateral configuration. The subframes are formed by upper and lower tubes. The subframes are connected at one end to a steering head and flare outwardly therefrom. A pair of loop shaped reinforcing members is provided on the steering head for securing the upper tube to the lower tube of each of the subframes. A mounting means is provided for securing a V-8 automobile engine block to mount the block along the centerline of the frame. Additionally, support means are provided for supporting the engine block within the housing.

Other features and advantages of the invention will be set forth in, or apparent from, the following detailed description of preferred embodiments of the invention.

DESCRIPTION OF THE PREFERRED EMBODIMENTS

Figure 1:
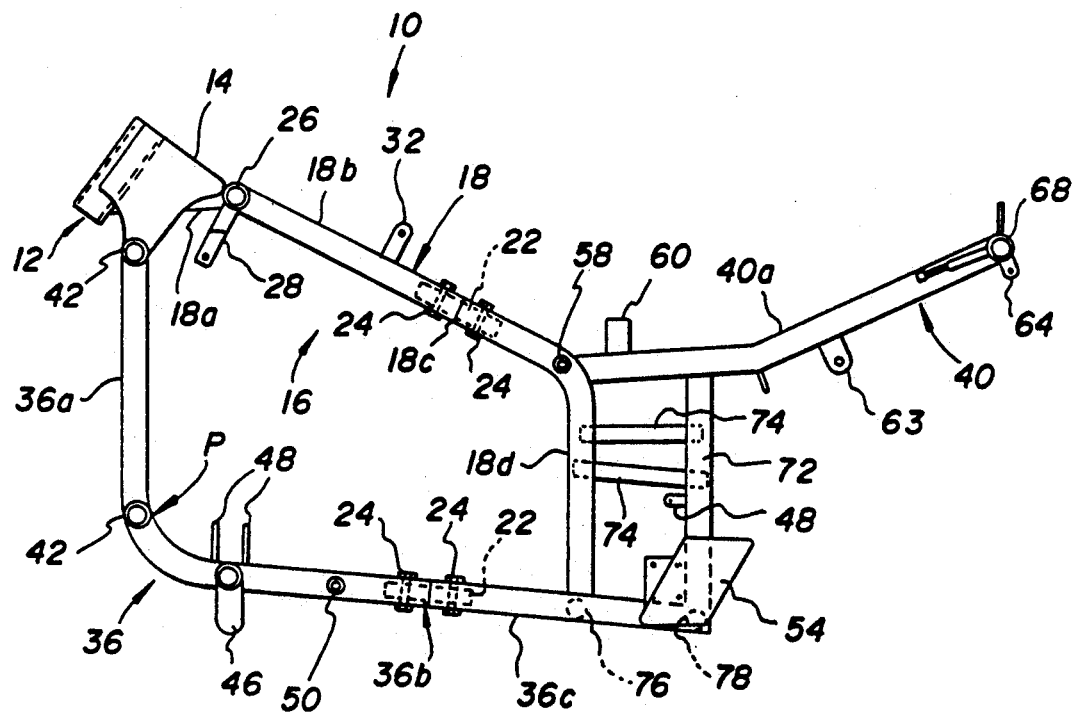
FIG. 1 is a right side elevational view of a motorcycle frame, constructed in accordance with a preferred embodiment of the invention.

Referring to the drawings, a frame, generally denoted 10, is provided for supporting a conventional automobile V-8 engine block (not shown). Frame 10 comprises essentially three sections, a steering head 12 which is mounted through a support plate 14, a housing 16 and a seat rail 40 attached to the housing 16. Housing 16 is designed to support the V-8 engine block so that the engine block is mounted along the centerline of frame 10, and is described more specifically hereinafter.

Housing 16 comprises two pairs of upper and lower tubes forming right and left subframes. As may be seen in FIGS. 1 and 2, upper tube 18 has one end secured to the top of support plate 14 with the forwardmost end portion 18b of the tube immediately adjacent the support plate 14 flaring outwardly (FIG. 2) at an angle of approximately 45° with respect to the longitudinal axis of the motorcycle as denoted by section 18a. The intermediate portion of tube 18 extends parallel to the longitudinal axis of the motorcycle and extends downwardly, terminating at point 18c. A connector rod 22 is used to secure front tube section 18b to a back tube section 18d, by bolts 24, to complete the structure of upper tube 18. Upper tube 18 has a hockey stick shape, i.e., having one long end portion aligned section 18b, and with the opposite end portion bending to form leg (short portion) which is perpendicular to the ground and then is secured to the corresponding lower tube 36, described hereinafter. Access to the engine block (not shown) is increased by allowing tube 18 to be separated at point 18c.

Figure 2:
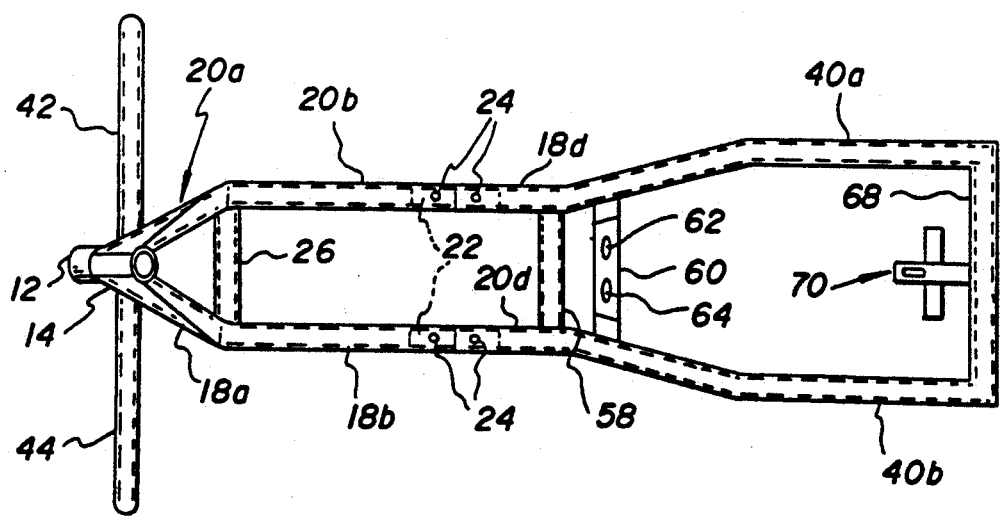
FIG. 2 is a top plan view of the motorcycle frame.
Figure 4:
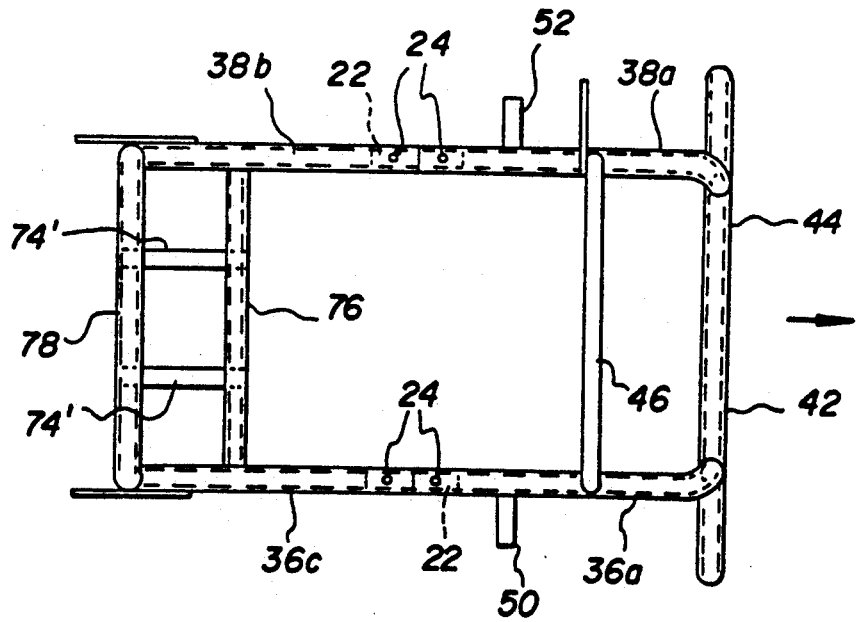
FIG. 4 is a bottom plan view of the motorcycle frame.
Figure 5:
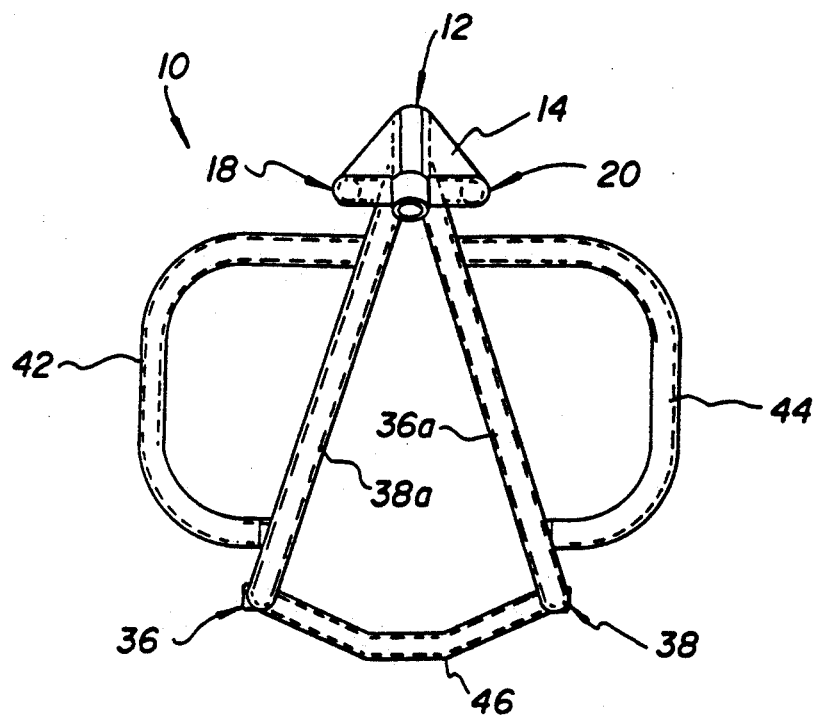
FIG. 5 is a front elevational view of the motorcycle frame.

The lower tube of subframe 18 is shown at 36 of FIG. 1. As may be seen in FIG. 1, lower tube 36 is formed in an L-shape by two sections 36a and 36c. Section 36a has one forwardmost end portion secured to support bracket 14 and extends with a short portion of the L-shape generally perpendicular to the ground and at an angle of approximately 15° from the centerline of the frame 10 as shown in FIG. 5. Section 36a bends 90° at the midportion thereof so as to have the other end thereof generally parallel with the ground. The other end of section 36a is attached to section 36c (forming the long portion of the L-shape), at point 36b, by a connector rod 22 and bolts 24 forming a separating or connecting means. Section 36c extends, parallel to the ground, past the upper tube 18 and partially below the seat rail 40. As stated above, section 18d is connected to section 36c. As may be seen in FIGS. 2, 4 and 5, a substantially semicircular support tube 42 attaches at one end to the end of tube 36a and at the other end to the bend at point P in tube 36a. Tube 42 adds structural rigidity to tube 36.

Figure 3:
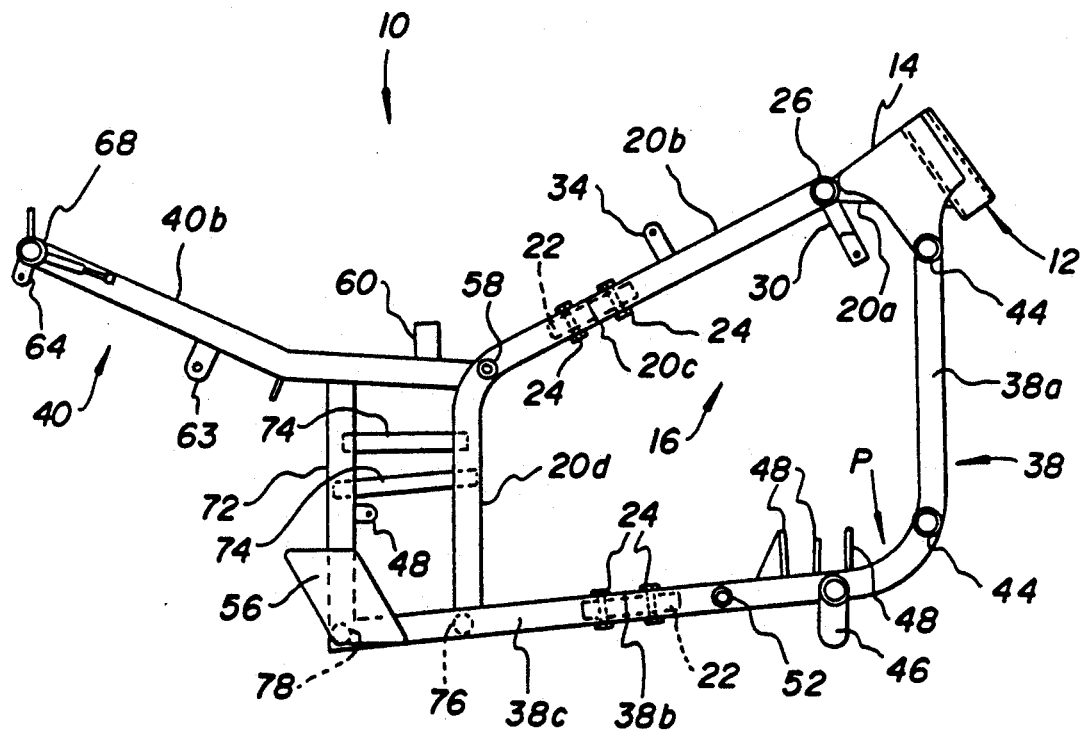
FIG. 3 is a left side view of the motorcycle frame.

The left side subframe shown in FIG. 3 is substantially identical to the right side subframe previously described. The left side upper tube 20 is formed by sections 20a, 20b and 20d which correspond to sections 18a, 18b and 18d of the right side subframe. There are further provided right and left motor mounts 28 and 30 which are located at the bends in sections 18b and 20b respectively. Gas tank mounts 32 and 34 are also provided on sections 18b and 20b respectively.

As shown in FIG. 3, the lower tube 38 of the left side subframe is formed by sections 38a and 38c correspond to sections 36a and 36c of the right side subframe. A substantially semicircular support tube 44 has one end thereof connected to one end of tube 38a. The lower end of tube 44 is connected to tube 38a at point P.

An engine block base tube 46 attaches tubes 36a and 38a at the bend P and thus provides lateral stability while also providing a base for the engine block. Engine block mounts 48 are located along an inner periphery of housing 16 on tube 46 and on tubes 36a and 38a, respectively. Foot rests 50 and 52, FIGS. 1 and 3, are provided on tube 36 and 38, respectively. Support plates 54 and 56 are mounted at the distal end of tubes 36 and 38, respectively.

The housing 16 may be readily disassembled into a front half and a back half by disconnecting the subframe tube sections 18b, 18d and sections 36a, 36c and the corresponding subframe tube sections 20a, 20b, and sections 38a, 38c, *with the associated separating means.*

Seat rail 40 is formed by right and left rails 40a and 40b, each of which is secured to upper tubes 18 and 20 by a brace 58. A seat mount 60 is provided between rails 40a and 40b. Seat mount 60 is provided with two holes 62 and 64 for allowing a seat (not shown) to be attached thereto. A shock absorber mount 63 (FIG. 1), is provided on each rail 40a and 40b for attachment to one end of a shock absorber. The other end of the shock absorber is attached to the rear wheel of the motorcycle. The distal end of rails 40a and 40b are connected via an end tube 68. Attached to the end tube 68 is a rear seat support 70. Legs 72, (FIGS. 1 and 3), are attached to each rail 40a and 40b, to the rear of seat mount 60, and are contiguous with the respective lower tubes 36c and 38c. Braces 74, FIG. 4, secure legs 72 to each respective upper tube section 18d and 20d.

Engine block mounts 48 are provided on legs 72, FIG. 1 and 3, for securing the rear of the engine block to housing 16. The distal ends of upper tube sections 18d and 20d are connected via brace 76, FIG. 4, and in a similar fashion a brace 78 connects the distal ends of lower tubes 36c and 38c. Additional cross braces 74 secure braces 76 and 78 together to provide longitudinal stability.

Figure 6:
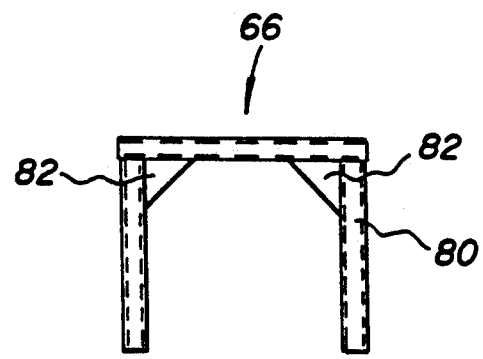
FIG. 6 is a plan view of an optional attachment to the motorcycle frame.

In FIG. 6, there is shown an optional saddle bag support 66. Saddle bag support comprises a generally U shaped tube 80 which attaches to mounts 64, FIGS. 1 and 3. Corner braces 82 are provided to add additional strength to tube 80. By attaching saddle bag support 66 to frame 10, a conventional trunk and saddle bags may be secured to the motorcycle.

Although the present invention has been described with respect to specific exemplary embodiments thereof, it will be understood by those skilled in the art that variations and modifications can be effected in these exemplary embodiments without departing from the scope and spirit of the invention.

What is claimed is:

1. A frame for a two wheeled vehicle having a longitudinal centerline which vehicle is to be powered by a conventional automobile V-8 engine block to be supported in the frame, the frame comprising:
   a steering head;
   a housing for the engine block which is formed by a left and a right subframe extending longitudinally and on respective sides of the vehicle,
   each said subframe having a substantially quadrilateral configuration when viewed from a side of the vehicle and being formed by an upper tube and a lower tube,
   each of said upper and lower tubes having a forwardmost end portion which is secured to said steering head and which then flares laterally away from said steering head, whereby said upper tubes and said lower tubes are all secured together at the forwardmost end portions thereof,
   each of said upper tubes also having an end distal from said forwardmost end which is connected to said lower tube of the respective said subframe,
   each of said subframes including a separating means for separating said upper tubes and said lower tubes into front and back sections whereby said housing is separated into a front half and a back half, and
   each said front section of said lower tubes including a semicircular support tube having an upper end and a lower end, said support tube being formed in a plane which extends laterally from the vehicle and with said upper end connected to said forwardmost end portion of said lower tube adjacent said steering head and with said lower end connected to said front section of said lower tube therebelow; and
   a mounting means for securing the engine block in said housing symmetrically about the longitudinal centerline of the vehicle, said mounting means including a base tube connected laterally between said front sections of said lower tubes.

2. A frame as claimed in claim 1 wherein said mounting means includes a plurality of block mounts located along an inner periphery of said quadrilateral subframes.

3. A frame as claimed in claim 1 wherein each said upper tube is generally hockey stick shaped having a long portion and a short portion, and wherein said separating means is located along said long portion.

4. A frame as claimed in claim 1 wherein each said lower tube is generally L shaped having a long portion and a short portion, and wherein said separating means is located along said long portion.

5. A frame as claimed in claim 1, and further including a U shaped seat rail having left and right portions with free ends connected to respective said upper tubes of said right and left subframes, and respective right and left braces connecting respective said right and left portions to said lower tubes of said right and left subframes.

6. A frame as claimed in claim 1 and further including a U shaped tube attached to said seat rail and extending rearwardly therefrom to provide a mounting for saddle bags.

* * * * *